United States Patent [19]

Horiuchi et al.

[11] Patent Number: 5,014,567

[45] Date of Patent: May 14, 1991

[54] GEAR TYPE TRANSMISSION

[75] Inventors: Ichiro Horiuchi, Chiryu; Shunichi Kawai, Nagoya, both of Japan

[73] Assignee: Aisin Seiki Kabushiki Kaisha, Kariya, Japan

[21] Appl. No.: 414,187

[22] Filed: Sep. 28, 1989

[30] Foreign Application Priority Data

Sep. 29, 1988 [JP] Japan .................. 63-244952

[51] Int. Cl.$^5$ .............................................. F16H 3/08
[52] U.S. Cl. ............................................................ 74/359
[58] Field of Search ........................ 74/333, 357, 359

[56] References Cited

U.S. PATENT DOCUMENTS

| | | | |
|---|---|---|---|
| 2,246,636 | 6/1941 | Peterson et al. | 74/359 X |
| 4,136,574 | 1/1979 | Morrison | 74/359 |
| 4,708,026 | 11/1987 | Ikemoto | 74/359 X |
| 4,738,150 | 4/1988 | Miner | 74/359 |
| 4,776,227 | 10/1988 | Janiszewski | 74/359 X |

Primary Examiner—Dirk Wright
Attorney, Agent, or Firm—Burns, Doane, Swecker & Mathis

[57] ABSTRACT

A gear type transmission comprising a casing, an input shaft supported by the casing, an output shaft supported by the casing and disposed coaxial to the input shaft, a counter shaft supported by the casing and disposed parallel to and axially offset from the input and output shafts, plural pairs of shift gears mounted on the input and counter shafts for engagement with each other, a pair of output gears on the output and counter shafts for engagement with each other, one gear of at least a low shift side of the plural pairs of shift gears fixed to the input shaft so as to rotate always simultaneously with the input shaft, the other gear of the low shift side of the plural pairs of shift gears attached to the counter shaft so as to rotate freely to the counter shaft, and a synchronized equipment mounted on the counter shaft and operating so as to make it rotate the other gear of the low shift side simultaneously with the counter shaft.

2 Claims, 2 Drawing Sheets

GEAR TYPE TRANSMISSION

BACKGROUND OF THE INVENTION

1. Field of the Invention

This invention is concerned with a gear type transmission which disposes an input shaft coaxially to an output shaft, and is used in automobiles or other vehicles.

2. Description the Related Art

A conventional gear type transmission which disposes the input shaft coaxially to the output shaft is shown in the repair manual of the TOYOTA R50 TRANSMISSION. In such a conventional transmission, as shown in FIG. 2, an input shaft 22 and an output shaft 23 are coaxially disposed in and supported with a casing 21, so that each of the shafts 22,23 is freely rotatable. A counter shaft 24 is supported by the casing 21 parallel to the shafts 22, 23, and freely rotatable with respect thereto. An input gear Ing is fixed on one end of the input shaft 22 and engages with a counter input gear CIng fixed to the counter shaft 24. A third gear $3g'$ is rotatably mounted on the output shaft 23 and engages with a counter third gear $C3'g$ fixed to the counter shaft 24. A second gear $2g'$ is rotatably mounted on the output shaft 23 and engages with a counter second gear $C2g'$ fixed TO the counter shaft 24. A first gear $1g'$ is rotatably mounted on the output shaft 23 and engages with a counter first gear $C1g'$ fixed to the counter shaft 24. A fifth gear $5g'$ is fixed to the output shaft 23 and engages with a counter fifth gear $C5g'$ rotatably mounted on the counter shaft 24. A third-fourth synchronized equipment 25 is set between the input shaft 22 and the output shaft 23. By the shifting of a sleeve of the synchronized equipment 25, the third gear $3g'$ may be connected indirectly to the output shaft 23 in a third gear position to rotate simultaneously with the output shaft 23. The input shaft 22 connects in a fourth gear position directly. A first-second synchronized equipment 26 is between the first gear $1g'$ and the second gear $2g'$ on the output shaft 23. By the shifting of a sleeve of the synchronized equipment 26, the first gear $1g'$ may connected in a first gear position indirectly to the output shaft 23 to rotate simultaneously with the output 23. In a second gear position, the second gear $2g'$ connects directly to the output shaft 23 to rotate simultaneously with the output shaft 23. A reverse gear $Rg'$ is formed on the outer periphery of the sleeve of the first-second synchronized equipment 26, and by the shifting of the sleeve, to a reverse shift position, the transmitting force of the counter reverse gear $CR'g$ is transmitted to the output shaft 23 through an idle gear (not shown in FIG. 2) disposed between the reverse gear $R'g$ and the counter reverse gear $CR'g$. A fifth synchronized equipment 27 is mounted on the counter shaft 24, and by the shifting of the sleeve, to a fifth gear position, the counter fifth gear $C5'g$ connects to the counter shaft 24 to rotate simultaneously with the counter shaft 24.

In the conventional transmission the first-second synchronized equipment 26 is fixed to the output shaft 23 and the counter shaft 24 rotates as a result of the transmission of tongue from the input shaft 22. Therefore, when the transmission is shifted to the first shift position, the operating force for the shifting of the first and second synchronized equipment 26 includes not only the force required to synchronize the output shaft 23 to the moment of inertia of the first gear $1g'$, but also the force necessary to synchronize the output shaft 23 to the moments of inertia of the counter shaft 23, and the input shaft 22. Therefore a large force is needed to shift gears. In particular, the synchronized equipment at lower gears requires a large shifting force.

The loading tongue operating on the pair of the shift gears is expressed by Tex, wherein $Te \times \lambda i$ is the input tongue from the input shaft 22, and $\lambda i$ is the reduction ratio between the input gear Ing and the counter input gear CIng. Each of the pairs of the shift gears must be designed for lasting quality in view of the tongue value. Therefore, the gear teeth must be increased in width and the increases corresponding in size and weight. The bearings transmission must also be designed to withstand heavier loads.

Further, the relative rotational parts between the first, second and third gears $1g'$, $2g'$, $3g'$ and the output shaft 23 are positioned in the upperpart of the casing 21. Therefore, lubricating oil may not be supplied to these relative rotational parts sufficiently. Particularly at higher speeds, the gears $1g'$, $2g'$, $3g'$ rotate continuously relative to the output shaft 23. Accordingly, the gears and the output shaft may be damaged.

SUMMARY OF THE INVENTION

It is an object of the invention to provide a gear type transmission which may be shifted with a small operating force.

It is another object of the invention to reduce the size and weight of a gear type transmission.

It is further another object of the invention to provide a gear type transmission which can adequately supply lubricating oil to all its rotational parts.

In order to accomplish the above objects, the gear type transmission of the present invention comprises a casing, an input shaft supported by the casing, an output shaft supported by the casing and disposed coaxial to the input shaft, a counter shaft supported by the casing and disposed parallel to and axially offset from the input and output shafts, plural pairs of shift gears on each of the input and counter shafts for engagement with each other, an output gear on each of the output and counter shafts for engagement with each other, one gear of at least a low-shift side of the plural pairs of shift gears fixed to the input shaft for continuous rotation simultaneously with the input shaft, the other gear of the low-shift side of the plural pairs of shift gears rotatably mounted to the counter shaft, and a synchronized equipment mounted on the counter shaft for synchronizing rotation of the other gear of the low-shift side simultaneously with the counter shaft.

DETAILED DESCRIPTION OF THE INVENTION

Figure 1:
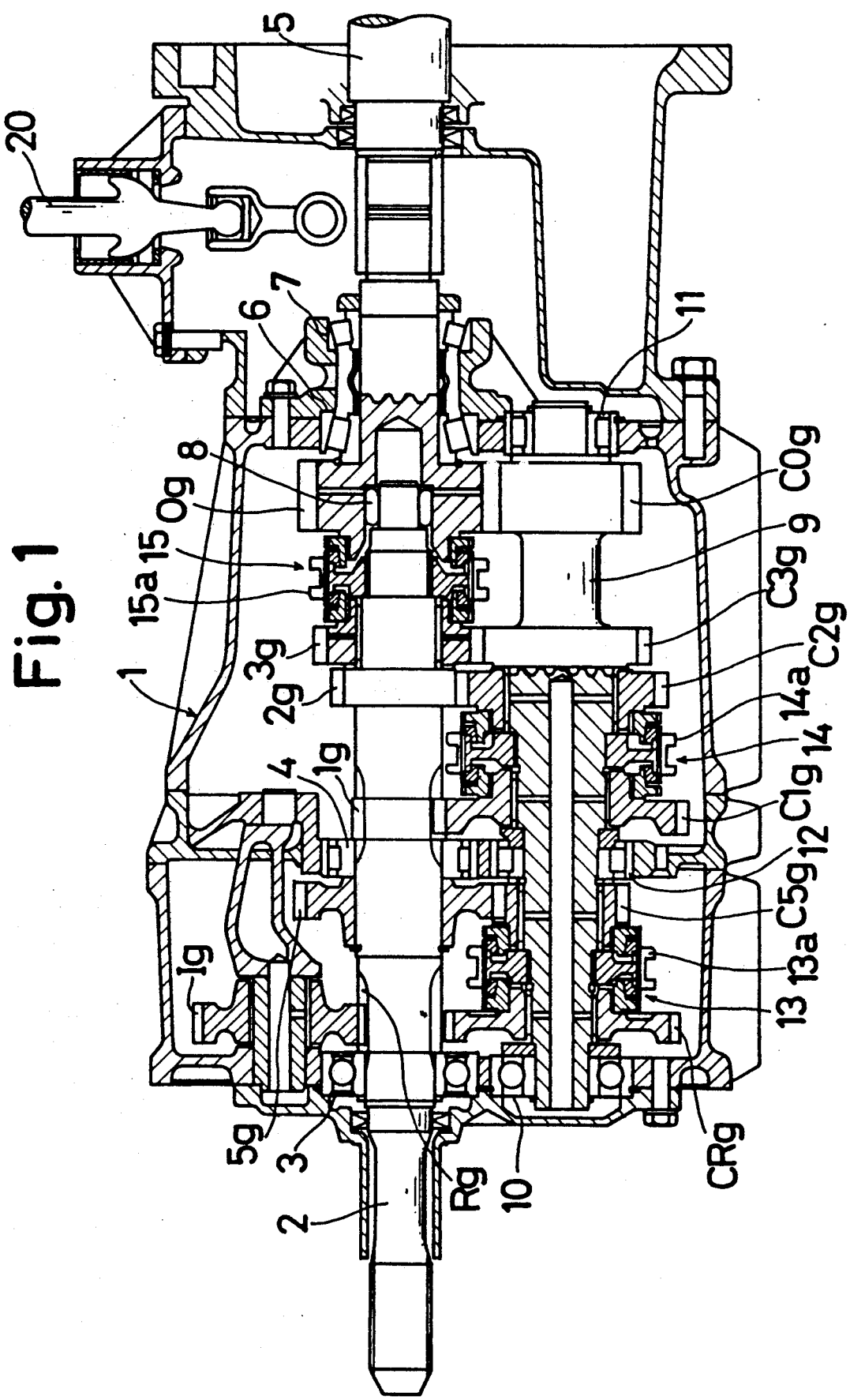
FIG. 1 shows a sectional view of the transmission of the invention.
Figure 2:
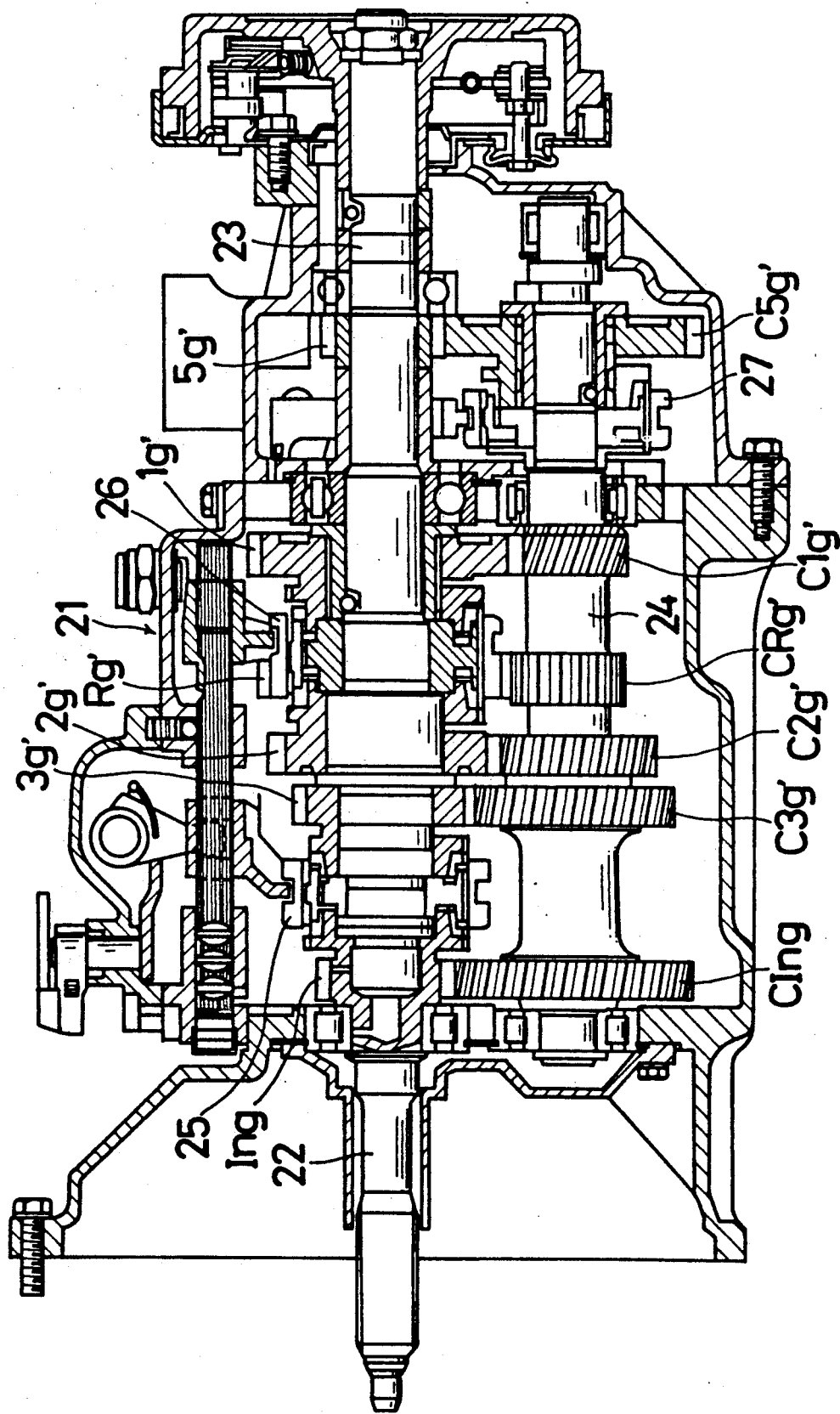
FIG. 2 shows a sectional view of a transmission of the Prior Art.

In FIG. 1 on input shaft 2 is inserted in a casing 1 at the one end and rotatably supported through bearings 3, 4. An output shaft 5 is inserted in the casing 1 at the other end and rotatably supported through bearings 6, 7. The inner end of the input shaft 2 is inserted in the inner end of the output shaft 5 and rotatably supported through a bearing 8. Axially offset from the input and output shafts 2, 5 in the casing 1, a counter shaft 9 is disposed parallel to the input and output shaft 2.5 and rotatably supported by the casing 1 through bearings 10, 11 at its opposite ends and a bearing 12 at its center. A reverse gear Rg, a fifth gear 5g, a first 1g and a second gear 2g are fixed to the input shaft 2 from the left to the right in FIG. 1, integrally formed or mounted for simultaneous rotation. A third gear 3g is rotatably mounted on the inner end of the input shaft 2. A counter reverse gear CRg is rotatably mounted on the counter shaft 9 at the relative position of the reverse gear Rg through an idle gear Ig rotatably mounted in the casing 1. A counter fifth gear C5g, a counter first gear C1g and a counter second gear C2g are rotatably mounted on the counter shaft 9 and engage with the fifth gear 5g, the first gear 1g and the second gear 2g, respectively. A counter third gear C3g is fixed to the counter shaft 9 and engages with the third gear 3g.

A reverse-fifth synchronized equipment 13 is set between the counter reverse gear CRg and the counter fifth gear CRg, and operates to make the counter reverse gear CRg or the counter fifth gear C5g rotate simultaneously with the counter shaft 9 selectively under the sliding of the hub sleeve 13a between two positions. A first-second synchronized equipment 14 is set between the counter first gear C1g and the counter second gear C2g, and operates to make the counter first gear C1g or the counter second gear C2g rotate simultaneously with the counter shaft 9 selectively under the sliding of the hub sleeve 14a between the two positions.

An output gear Og is formed in the inner end of the output shaft 5 to rotate simultaneously with the output shaft 5, and ax counter output gear COg is formed in the end of the counter shaft 9 to rotate simultaneously with the counter shaft 9 and to engage with the output gear Og. A third-forth synchronized equipment 15 is set between the third gear 3g and the output gear Og, and operates to make the third gear 3g or the output gear Og rotate simultaneously with the input shaft 2 under the sliding of the hub sleeve 15a between two positions.

The above mentioned construction operates follows. By knowing the shift lever 20 to the first shift position, the hub sleeve 14a of the first-second synchronized equipment 14 slides in the direction of the counter first gear C1g (to the left direction in FIG. 1), and the counter first gear C1g is connected to the counter shaft 9. The engine tongue from the input shaft 2 thereby is transmitted to the output shaft 5 through the first gear 1g, the counter first gear C1g, the hub sleeve 14a, the counter shaft 9, the counter output gear COg and the output gear Og with a predetermined reduction.

By moving the shift lever 20 to the second shift position, the hub sleeve 14a slides in the direction of the counter second gear C2g (to the right direction in FIG. 1) and the counter second gear C2g is connected to the counter shaft 9. The engine tongue from the input shaft 2 thereby is transmitted to the output shaft 5 through the second gear 2, the counter second gear C2g, the hub sleeve 14a, the counter shaft 9, the counter output gear COg and the output gear Og with a predetermined reduction. By moving the shift lever 20 to the third shift position, the hub sleeve 15a of the third-forth synchronized equipment 15 slides in the direction of the third gear 3g (to the left direction in FIG. 1) and is connected to the input shaft 2. The engine tongue from the input shaft 2 thereby is transmitted to the output shaft 5 through the hub sleeve 15a, the third gear 3g, the counter third gear C3g, the counter shaft 9, the counter output gear COg and the output gear Og with a predetermined reduction.

By moving the shift lever 20 to the forth shift position, the hub sleeve 15a slides in the direction of the output gear Og (to the right direction in FIG. 1) and the input shaft 2 is connected directly to the output shaft 5 through the hub sleeve 15a. The engine tongue from the input shaft 2 thereby is transmitted to the output shaft 5 without a reduction or an over-drive.

By moving the shift lever 20 to the fifth shift position, the hub sleeve 13a of the reverse-shift synchronized equipment 13 slides in the direction of the counter fifth gear C5g (to the right direction in FIG. 1) and the counter fifth gear C5g is connected to the counter shaft 9. The engine tongue from the input shaft thereby is transmitted to the output shaft through the fifth gear 5g, the counter fifth gear C5g, the hub sleeve 13a, the counter shaft 9, the counter output gear COg and the output gear Og with a predetermined over drive relationship.

By moving the shift lever 20 to the reverse shift position, the hub sleeve 13a slides in the direction of the counter reverse gear CRg (to the left direction in FIG. 1) and the counter reverse gear CRg is connected to the counter shaft 9. The engine tongue from the input shaft is transmitted to the output shaft 5 through the reverse gear Rg, the idle gear 1g, the counter reverse gear CRg, the hub sleeve 13a, the counter shaft 9 and the counter output gear COg with an opposite rotation to that of the input shaft 2.

As mentioned above in the transmission of the invention, each of at least a low-shift side of the plural pairs of shift gears includes a gear (1g, 2g, Rg) fixed to the input shaft 2 and a counter gear (C1g, C2g, CRg) rotatably mounted on the output shaft 5 and engaging with the gear (1g, 2g, Rg), and the synchronized equipments operating to connect the counter gears to the counter shaft are mounted on the counter shaft. Thus, during shifting, the moment of inertia of the counter gear rotated by the gear of the input shaft is small. Consequently, the operating force of the synchronized equipment may be small, and it is possible to shift with a small operating force. Therefore, it is possible to reduce size and weight of the synchronized equipment.

By fixing the gears to the input shaft, the loading tongue operating on the pair of gears is expressed by only the input tongue (Te). Therefore, the teeth of the pair of gears may be smaller in width, and the output gear and the counter output gear can be matched to the tongue value expressed by multiplying the input tongue (Te) by the reduction ration ($\lambda i$). Consequently, it is possible to reduce the size and weight of the transmission.

Further, the relative rotational parts between the shaft and gears is on the counter shaft disposed axially offset from the input shaft and the output shaft. Therefore, the relative rotational parts easily can be exposed to the oil in the lower part of the casing. Further, therefore, bearings between the counter shaft and the counter gears may be eliminated with an additional reduction in cost.

What is claimed is:
1. A gear type transmission comprising:
a casing provided with first and second bearing assemblies;
an input shaft supported by said casing; an output shaft coaxial to said input shaft and rotatably supported by said first and second bearing assemblies mounted in said casing, said first and second bearing assemblies positioned on one side of an output gear provided on said output shaft;

a counter shaft supported by said casing parallel to and axially offset from said input and output shafts and connected to said output shaft;

plural pairs of shift gears, one shift gear of each plural pair being mounted on each of said input and counter shafts for engagement with each other, including a low shift group;

an output gear on said counter shaft for engagement with said output gear on said output shaft;

one gear of the low shift group of said plural pairs of shift gears being fixed to said input shaft for continuous rotation simultaneously with said input shaft;

another gear of the low shift group of said plural pairs of shift gears being rotatably attached to said counter shaft; and synchronizing means on said counter shaft for rotating the other gear of the low shift group simultaneously with the counter shaft.

2. A gear type transmission according to claim 1 wherein:

the low-shift group of said plural pairs of shift gears includes pairs of shift gears corresponding to a first shift state, a second shift state and a reverse shift state respectively, said pairs of shift gears for the first shift state and the second shift state being side by side, and said synchronizing means including a portion corresponding to the first and second shift state disposed between said pairs of shift gears for the first and second states.

* * * * *